United States Patent
Bush et al.

(10) Patent No.: US 11,611,231 B2
(45) Date of Patent: Mar. 21, 2023

(54) UNINTERRUPTIBLE POWER SUPPLY SYSTEM HAVING STRANDED POWER RECOVERY

(71) Applicant: VERTIV CORPORATION, Columbus, OH (US)

(72) Inventors: Terry D. Bush, Westerville, OH (US); Kevin B. Carney, Marengo, OH (US); Peter A. Panfil, Columbus, OH (US)

(73) Assignee: VERTIV CORPORATION, Westerville, OH (US)

( * ) Notice: Subject to any disclaimer, the term of this patent is extended or adjusted under 35 U.S.C. 154(b) by 0 days.

(21) Appl. No.: 17/675,257

(22) Filed: Feb. 18, 2022

(65) Prior Publication Data
US 2022/0173610 A1 Jun. 2, 2022

Related U.S. Application Data

(63) Continuation of application No. 17/082,628, filed on Oct. 28, 2020, now Pat. No. 11,283,289.

(60) Provisional application No. 62/926,594, filed on Oct. 28, 2019.

(51) Int. Cl.
*H02J 9/00* (2006.01)
*H02J 9/06* (2006.01)

(52) U.S. Cl.
CPC ............... *H02J 9/062* (2013.01); *H02J 9/068* (2020.01)

(58) Field of Classification Search
CPC .... H02J 9/00; H02J 9/062; H02J 9/068; H02J 3/38; H02J 3/381; H02J 3/40
See application file for complete search history.

(56) References Cited

U.S. PATENT DOCUMENTS

| | | | |
|---|---|---|---|
| 6,813,897 B1 * | 11/2004 | Bash | G06F 1/206 307/64 |
| 7,141,892 B2 | 11/2006 | Dai et al. | |
| 7,492,058 B2 | 2/2009 | Chen | |
| 8,143,743 B2 | 3/2012 | Lu et al. | |
| 9,496,713 B1 * | 11/2016 | Krolak | H02J 1/10 |
| 9,692,315 B2 | 6/2017 | Backman et al. | |

(Continued)

FOREIGN PATENT DOCUMENTS

WO 2016099938 A1 6/2016

OTHER PUBLICATIONS

International Search Report and Written Opinion dated Jan. 15, 2021 for PCT/US2020/057717.

(Continued)

*Primary Examiner* — Rexford N Barnie
*Assistant Examiner* — Rasem Mourad
(74) *Attorney, Agent, or Firm* — Suiter Swantz pc llo

(57) ABSTRACT

An uninterruptible power supply (UPS) system with stranded power recovery has a plurality of UPS modules with one or more of the UPS modules usable to provide stranded power to a recovered power bus. When a UPS module is used to provide stranded power to the recovered power bus, the AC/AC converter associated with that UPS module provides AC power that is synchronized with AC power being provided to the recovered power bus by each of the other AC/AC converters that are providing AC power. In this manner all of the AC/AC converters that are providing AC power to the recovered power bus have the same voltage, the same frequency, and are in phase.

20 Claims, 3 Drawing Sheets

(56) References Cited

U.S. PATENT DOCUMENTS

| | | |
|---|---|---|
| 10,270,285 B2 | 4/2019 | Mandarino et al. |
| 2003/0227785 A1 | 12/2003 | Johnson |
| 2013/0080793 A1* | 3/2013 | Familiant .................. G06F 1/26 713/300 |
| 2015/0121113 A1* | 4/2015 | Ramamurthy ...... H02J 7/00712 713/340 |
| 2016/0181861 A1 | 6/2016 | Familiant et al. |
| 2017/0005514 A1 | 1/2017 | Merkel et al. |

OTHER PUBLICATIONS

Kissaoui, M. et al., "Adaptive control of uninterruptible power supply based on AC/AC Power Converter", 2014 International Conference on Multimedia Computing and Systems (ICMCS), Marrakech, Morocco, 2014, pp. 1557-1562, doi: 10.1109/ICMCS. 2014.6911208.

* cited by examiner

UNINTERRUPTIBLE POWER SUPPLY SYSTEM HAVING STRANDED POWER RECOVERY

CROSS-REFERENCE TO RELATED APPLICATIONS

This application claims the benefit of U.S. patent application Ser. No. 17/082,628, filed on Oct. 28, 2020. The U.S. patent application Ser. No. 17/082,628, filed on Oct. 28, 2020, claims the benefit of U.S. Provisional Application No. 62/926,594, filed on Oct. 28, 2019. The entire disclosures of U.S. patent application Ser. No. 17/082,628, filed on Oct. 28, 2020, and U.S. Provisional Application No. 62/926,594, filed on Oct. 28, 2019, are incorporated by reference in their entireties.

FIELD

The present disclosure relates to uninterruptible power supply systems having a plurality of uninterruptible power supply modules, and more specifically to stranded power recovery in such systems.

BACKGROUND

This section provides background information related to the present disclosure which is not necessarily prior art. As used herein, "UPS" is "uninterruptible power supply."

One common UPS system configuration has a plurality of UPS modules, often several, with each UPS module having a load associated therewith to which that UPS module provides power. Such UPS systems are often used in data centers. It is common for such UPS systems to have unused or stranded capacity that is not immediately available for delivery to a load. This can result from mistakes or insufficient information during design, unplanned changes in system configuration, or even intentional underutilization to allow for future growth. The un-utilized power may be a relatively small percentage of the capacity of any single UPS module included in a large UPS system. However, the underutilized capacity of each of the UPS modules, when combined, can easily be enough to power any one of the system loads. At any rate, it is desirable to have this total excess capacity available to power a load if a UPS module fails or requires maintenance shutdown. This excess capacity is commonly referred to as "stranded capacity" or "stranded power" and will be referred to herein as "stranded power."

One prior art approach to utilizing the stranded power is to recover the stranded power through the use of static switches (for example, solid state switches, relays, remotely controlled circuit breakers) to connect the AC power outputs of one or more of the UPS modules to a common AC power bus, referred to herein as a "recovered power bus." This recovered power bus is then used as a source of backup or standby power. In the event of a failure or shutdown of a UPS module, the load associated with that UPS module is switched away from the AC power output of that UPS module and connected to the recovered power bus through a static transfer switch or circuit breaker.

FIG. 1 is a simplified block diagram of an example prior art UPS system 100 having such stranded power recovery. UPS system 100 includes a plurality of UPS modules 102. In the example of FIG. 1, UPS system 100 has five UPS modules 102—UPS modules 102(a)-102(e). Each UPS module 102(a)-102(e) has a load 104 associated therewith for which that specific UPS module 102(a)-102(e) provides power. Each UPS module 102(a)-102(e) also has a static transfer switch 106 associated therewith. Each UPS module 102(a)-(e) has an AC power output 108 coupled to an AC power input 110 of the associated static transfer switch 106. Each static transfer switch 106 has an AC power output 112 coupled to the associated load 104. Each static transfer switch 106 has a second AC power input 114 coupled to a recovered power bus 116.

One or more of the UPS modules 102(a)-(e) is/are usable to provide stranded power to recovered power bus 116. Each UPS module 102(a)-(e) that is usable to provide stranded power to recovered power bus 116 has its AC power output 108 coupled to an AC power input 118 of an associated static switch 120. An AC power output 122 of each static switch 120 is coupled to recovered power bus 116.

It should be understood that there may be a UPS module(s) 102 that is not used to provide stranded power to recovered power bus 116. In this regard, each UPS module 102(a)-102(e) that is not used to provide stranded power to recovered power bus 116 then would not have an associated static switch 120, and thus would also not be coupled to power sharing control bus 124, as illustratively shown by UPS module 102(e) in FIG. 1.

It can be appreciated that all the UPS modules 102(a)-(e) that are usable to provide recovered stranded power to the recovered power bus 116 are effectively connected together through the static switches 120 and recovered power bus 116 when their associated static switches 120 are closed. This imposes certain constraints on the system design. For example, it requires that these UPS modules 102(a)-(e) must each have a power sharing control system connected between all the others, as well as being connectable to the recovered power bus 116. This is accomplished by coupling the power sharing control system of each UPS module 102(a)-(e) to a separate control bus, shown representatively in FIG. 1 as power sharing control bus 124. It also requires that all these UPS modules 102(a)-(e), when connected to the recovered power bus, are synchronized in regards to voltage, frequency, and phase relationship of their AC output voltages. In this regard, the AC power provided by the recovered power bus has a nominal voltage and frequency, such as 480 VAC at 60 Hz. When a UPS module 102(a)-(e) is connected to the recovered power bus, it must provide the AC power at its output at the nominal voltage and frequency. The provided AC power must also be in phase with the AC power provided by the other UPS modules 102(a)-(e) connected to the recovered power bus. Finally, all these UPS modules 102, when connected to the recovered power bus, must be operating in the same mode (i.e., double conversion, economy mode, bypass, etc.).

These design constraints can create a number of undesirable limitations. For one, the power sharing system must be pre-installed or the UPS system must be shut down to install a power sharing system before stranded power recovery can be enabled. All of the UPS modules 102(a)-(e) that are usable to provide stranded power to the recovered power bus must have the same power rating (KVA size) for the power sharing to work properly. If any one of the UPS modules connected to the recovered power bus transitions to a different operating mode than the others that are connected to the recovered power bus, it must be disconnected from the recovered power bus and will no longer be available to contribute stranded power to the recovered power bus. It would therefore be desirable to have a UPS system having stranded power recovery that does not suffer from the above-described constraints.

SUMMARY

This section provides a general summary of the disclosure, and is not a comprehensive disclosure of its full scope or all of its features.

In one aspect the present disclosure relates to an uninterruptible power supply system in communication with a recovered power bus. The system may comprise a plurality of uninterruptible power supply (UPS) modules, with one or more of the UPS modules usable to provide stranded power to the recovered power bus. Each UPS module is usable to provide stranded power to the recovered power bus, and has associated therewith a static transfer switch, a load, and an AC/AC converter. The AC/AC converter receives a first AC power output from the UPS at an AC input thereof, and generates a second AC power output at an AC output thereof, which is applied to the recovered power bus. The UPS has the first AC power output coupled to a first AC power input of the static transfer switch, and a third AC power output associated with the static transfer switch is coupled to the load. A second AC power input of the static transfer switch is coupled to the recovered power bus. When any of the UPS modules is used to provide stranded power to the recovered power bus, its associated AC/AC converter provides, at its associated AC power output, the second AC power output. The second AC power output is synchronized with other ones of the second power outputs being provided to the recovered power bus by each of the other AC/AC converters that are providing AC power to the recovered power bus. In this manner the second AC power outputs of all of the AC/AC converters that are being provided to the recovered power bus have at least one of the same voltage, the same frequency, or the same phase.

In another aspect the present disclosure relates to an uninterruptible power supply system in communication with a recovered power bus. The system may comprise a plurality of uninterruptible power supply (UPS) modules, with one or more of the UPS modules usable to provide stranded power to the recovered power bus. Each UPS module is usable to provide stranded power to the recovered power bus and has associated therewith a static transfer switch having first and second AC power inputs, and an AC output. Each UPS module further has an associated load and an associated AC/AC converter having an active rectifier front end and an inverter back end. The active rectifier front end has an input for receiving a first AC power output from the UPS, and the inverter back end generates a second AC power output which is applied to the recovered power bus. The UPS further has the first AC power output coupled to the first AC power input of the static transfer switch, and the second AC power input of the static transfer switch coupled to the recovered power bus, with the AC output of the static transfer switch being coupled to the load. When any of the UPS modules is used to provide stranded power to the recovered power bus, its associated AC/AC converter provides, at its associated said AC power output, the second AC power output. The second AC power output is synchronized with other ones of the second power outputs being provided to the recovered power bus by each of the other AC/AC converters that are providing AC power to the recovered power bus. In this manner the second AC power outputs of all of the AC/AC converters that are being provided to the recovered power bus have the same voltage, the same frequency and the same phase.

In still another aspect the present disclosure relates to a method for forming an uninterruptible power supply (UPS) system in communication with a recovered power bus. The method comprises using a plurality of UPS modules to each provide a first AC power output to a first input of an associated static transfer switch and to an input of an associated AC/AC converter. The method further includes using the AC/AC converters to each provide a second AC power output to the recovered power bus. The method further includes using the static transfer switches to receive power at a second input thereof from the recovered power bus, and using each of the static transfer switches to provide a third power output to a load associated therewith. The load associated therewith is further associated with a specific one of the UPSs. The method further includes controlling all of the AC/AC converters so that all of the second AC power outputs being applied to the recovered power bus are synchronized in at least one of voltage, frequency or phase.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
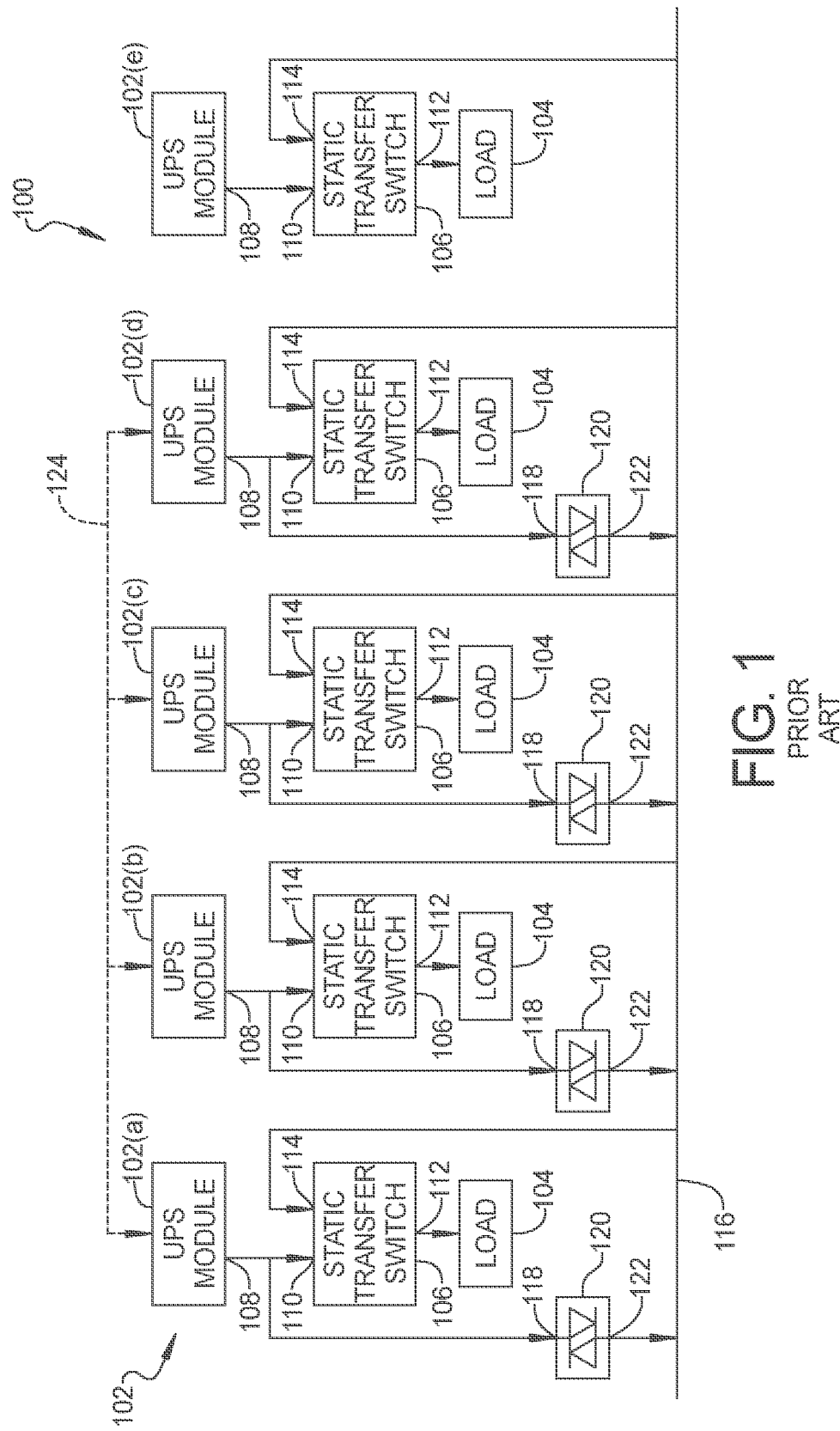
FIG. 1 is a simplified block diagram of a prior art UPS system having stranded power recovery.

Example embodiments will now be described more fully with reference to the accompanying drawings. Corresponding reference numerals indicate corresponding parts throughout the several views of the drawings.

Figure 2:
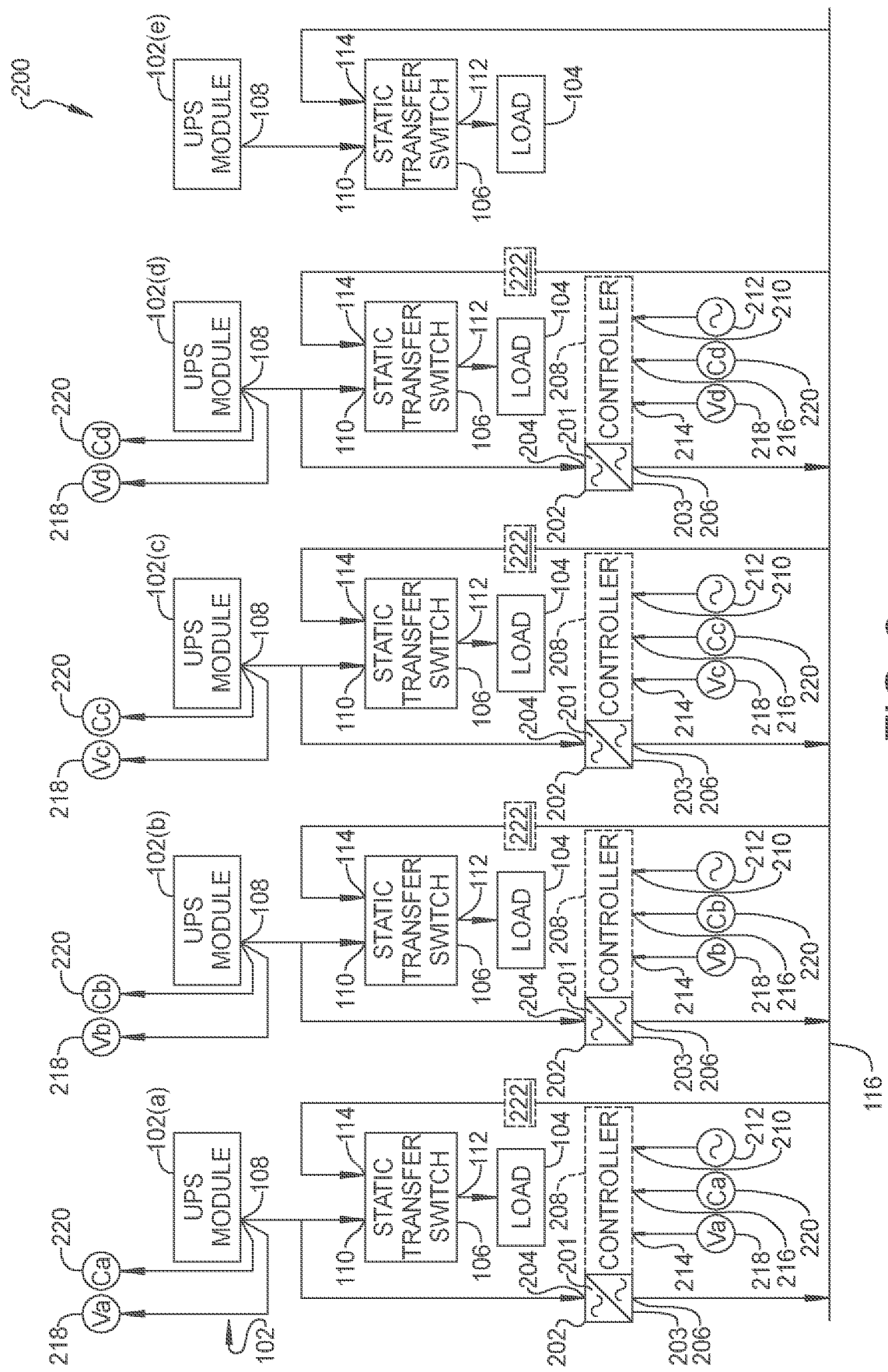
FIG. 2 is a simplified block diagram of a UPS system having stranded power recovery in accordance with an aspect of the present disclosure.

FIG. 2 is a simplified block diagram of a UPS system 200 having stranded power recovery in accordance with an aspect of the present disclosure. With the differences discussed below, UPS system 200 is the same as UPS system 100 and the components UPS system 200 has in common with UPS system 100 are identified in FIG. 2 with the same reference numbers used in FIG. 1.

In UPS system 200, the UPS modules 102(a)-(e) that can provide stranded power to recovered power bus 116 have an associated AC/AC converter 202 instead of an associated static switch 120. The AC power output of each of these UPS modules 102(a)-(e) is coupled to an AC power input 204 of the associated AC/AC converter 202 and an AC power output 206 of each AC/AC converter 202 is coupled to recovered power bus 116. Since UPS system 200 does not need a power sharing control system, FIG. 2 does not show UPS system 200 having power sharing control bus 124.

The AC/AC converters 202 illustratively have an active rectifier front end 201 having AC power input 204 and an inverter back-end 203 having AC power output 206. The AC/AC converters 202 thus have the same topology as a double conversion uninterruptible power supply, but without a back-up DC power source or bypass. The active rectifier front end 201 of each AC/AC converter self-synchronizes to the output power provided by the associated UPS module 102 in known fashion in the same manner as the active rectifier of a double conversion UPS self-synchronizes to the input power. As such, there need not be, and in an aspect, there is not, a synchronization signal from the UPS module 102 to the associated AC/AC converter 202 to synchronize the active rectifier front end 201 of the AC/AC converter 202 to the associated UPS module 102(a)-(e), or any other type of control signal from the UPS module 102 to the associated AC/AC converter 202. This is particularly advantageous when retrofitting a UPS system to add stranded power recovery as AC/AC converters 202 operate autonomously of the UPSs 102 and can be installed as stand-alone units without the need for any control interconnections with the UPSs 102(a)-(e). An AC/AC converter can connect to the output of any UPS module 102 without any modification of the UPS module 102(a)-(e). The UPS module 102(a)-(e) then simply sees its associated AC/AC converter 202 as another load.

The outputs 206 of the AC/AC converters 202 are synchronized with each other so that the AC power at the AC power outputs of the AC/AC converters 202 all have the nominal voltage and nominal frequency at which AC power is to be provided on the recovered power bus 116, within industry accepted tolerances, such as no more than +/−1% (RMS) for voltage and +/−0.1% for frequency, and are all in phase. In this regard, each AC/AC converter 202 includes a controller 208 that is configured to control that AC/AC converter 202 so that the AC power at AC power output 206 of that AC/AC converter 202 has the nominal voltage, nominal frequency, and is in phase with the AC power at the AC power outputs of the other AC/AC converters 202 that are providing AC power to the recovered power bus 116.

In the example shown in FIG. 2, the AC/AC converters 202 each have a synchronization input 210 coupled to a common synchronization reference 212. By way of example and not of limitation, common synchronization reference 212 provides an AC signal (analog or digitized), referred to herein as an AC reference signal, having a frequency that is the nominal frequency. For example, if this nominal output frequency is 60 Hz, then the AC reference signal has a frequency of 60 Hz and if this nominal frequency is 50 Hz, then the AC reference signal has a frequency of 50 Hz. By way of example and not of limitation, the AC reference signal is used by controllers 208 as a phase reference. The controllers 208 are configured to control their respective AC/AC converters 202 to synchronize the phase of the AC output power at the AC power output 206 to the phase of the AC reference signal so that the AC output power at the AC power outputs 206 of the A/AC converters 202 are all in phase. The controllers 208 then are also configured to control their respective AC/AC converters 202 so that they all have the nominal voltage and frequency, and thus have the same voltage and frequency. It should be understood that controllers 208, for example, utilize a conventional control technique to control their respective AC/AC converters, such as by controlling parameters of a pulse width modulated signal(s) that switches power switching semiconductors of the AC/AC converters 202.

It should be understood that the common synchronization reference 212 could be separate from the AC/AC converters 202 or could be implemented in one of controllers 208. In the latter example, the controller 208 of one of the AC/AC converters acts as a synchronization master and sends out a synchronization signal to the controllers 208 of each of the other AC/AC converters, which could also be an AC reference signal (analog or digitized).

Each controller 208 monitors the AC power output by the UPS module 102 with which the AC/AC converter 202 having that controller 208 is associated. For example, each controller 208 has inputs 214, 216 coupled to a voltage sensor 218 and a current sensor 220, respectively, which are coupled to the AC power output 108 of the associated UPS module 102(a)-(e). A power rating of the associated UPS module 102(a)-(e) is pre-programmed into controller 208 of the associated AC/AC converter 202. As is understood in the art, the power rating of a UPS module is the maximum power that the UPS module is rated to provide.

In a variation, controller 208 may receive an input, such as from its associated UPS module 102(a)-(e) or other device, that notifies the controller 208 in real-time what a present maximum available power capacity of the associated UPS module 102(a)-(e) is. This can be used for controlled load shedding. For example, if the associated UPS module 102(a) is in back-up power mode where power is being provided by the back-up DC power source of UPS module 102(a), such as a battery or generator, the maximum available power capacity of UPS module 102(a) may then be reduced and communicated to the controller 208 of its associated AC/AC converter 202. Controller 208 then, for example, reduces the amount of power that AC/AC converter 202 recovers from the associated UPS module 102(a).

Figure 3:
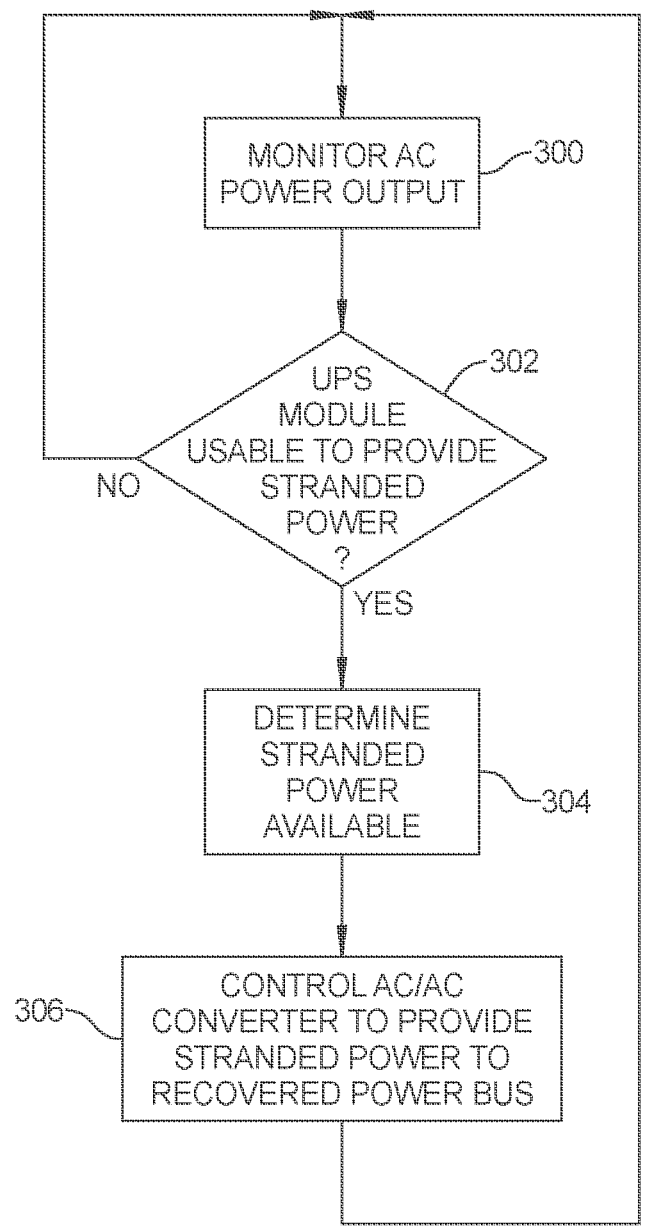
FIG. 3 is a flow chart for control logic for control of AC/AC converters of the UPS system of FIG. 2 to provide stranded power recovery in accordance with an aspect of the present disclosure.

FIG. 3 is a flow chart of a control routine of illustrative control logic implemented in each controller 208 for controlling the operation of AC/AC converter 202. At operation 300, the control routine monitors the AC power being output by the specific UPS module 102(a)-(e) associated with that AC/AC converter 202. At operation 302, the control routine determines whether the associated UPS module 102(a)-(e) can be used to provide stranded power to the recovered power bus 116. If not, the control routine branches back to 300. For example, the associated UPS module 102(a)-(e) may be offline and thus cannot provide stranded power to the recovered power bus 116, or the load 104 associated with that particular UPS module 102(a)-(e) may be drawing the maximum power that that particular UPS module 102(a)-(e) is rated to provide.

If at operation 302 the control routine determines the associated UPS module 102(a)-(e) can be used to provide stranded power to recovered power bus 116, the control routine at operation 304 determines the stranded power available from the associated UPS module 102(a)-(e) by subtracting the amount of AC power being output by the associated UPS module 102(a)-(e) from the power rating of the associated UPS module 102(a)-(e) pre-programmed in controller 208. At operation 306 the control routine synchronizes the AC power at AC power output 206 of that AC/AC converter 202 to the nominal voltage, nominal frequency, and nominal phase so that it will have the same voltage, frequency, and phase as the AC power at the AC power outputs 206 of the other AC/AC converters 202 providing power to the recovered power bus, and controls the AC/AC converter 202 to provide some or all of the stranded power to the recovered power bus 116. The control routine then branches back to operation 300.

In an aspect, controller 208 is configured to control the AC/AC converter 202 to limit the power the AC/AC converter can draw from the associated UPS module 102(a)-(e) so that the power rating of the associated UPS module 102(a)-(e) is not exceeded. In an aspect, controller 208 is configured to control the AC/AC converter 202 so that the maximum power that it can draw from the associated UPS module 102(a)-(e) is less than the amount of stranded power available. By way of example and not of limitation, controller 208 is configured so that the maximum power its associated AC/AC converter 202 can draw from its associated UPS module 102(a)-(e) is ten percent less than the amount of stranded power that controller 208 determines is available. It should be understood that this setting may be a calibratable setting.

In a variation, controllable breakers 222 (shown in phantom in FIG. 2) are installed between the recovered power bus 116 and the second AC power inputs 114 of the static transfer switches 106 associated with ones of the UPS modules 102(a)-(e) that can be connected to the recovered power bus 116. The controllable breakers 222 are controlled so that they prevent any load 104 from being connected to the recovered power bus 116 that cannot be supported by the AC power available on the recovered power bus 116, which is the total unused or stranded power of the UPS modules 102(a)-(e) that are providing AC power to the recovered power bus 116 via their associated AC/AC converters 202. The controllable breakers 222 may, for example, be controlled by controllers 208 or by a separate controller (not shown). Controllable breakers 222 may be, by way of example and not of limitation, remotely controlled circuit breakers, static AC switches or contactors. In an aspect of this variation, the controllers 208 of the AC/AC converters 202 communicate with each other, such as wirelessly or over a communication bus (not shown).

It should be understood that the logic for the foregoing control of AC/AC converters 202 by their respective controllers 208 illustratively can be implemented in hardware logic, software logic, or a combination of hardware and software logic. In this regard, each controller 208 can be or can include any of a digital signal processor (DSP), microprocessor, microcontroller, or other programmable device that is programmed with software implementing the above-described methods. It should be understood that alternatively it is or includes other logic devices, such as a Field Programmable Gate Array (FPGA), a complex programmable logic device (CPLD), or application specific integrated circuit (ASIC). When it is stated that controller 208 performs a function or is configured to perform a function, it should be understood that controller 208 is configured to do so with appropriate logic (such as in software, logic devices, or a combination thereof).

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system to provide power to a recovered power bus, the system comprising:
   an AC/AC converter that receives power from a UPS module and generates a second power output which is applied to the recovered power bus, the AC/AC converter including:
   an active rectifier front end to receive the power from the UPS module;
   an inverter back end for generating the second power output applied to the recovered power bus; and
   a controller, wherein the controller is configured to:
   monitor the power from the UPS module;
   determine whether the UPS module is able to provide stranded power to the recovered power bus;
   determine an amount of stranded power that is able to be provided by the UPS module by calculating a difference between a power rating of the UPS module and an amount of power being provided by the UPS module; and
   controlling the AC/AC converter to supply power from the UPS module in an amount of the difference between the power rating of the UPS module and the amount of power being provided by the UPS module to the recovered power bus, wherein the second power output applied to the recovered power bus is synchronized to at least one of a same voltage, a same frequency, or a same phase as provided by another AC/AC converter that applies power to the recovered power bus.

2. The system of claim 1, wherein the second power output applied to the recovered power bus is synchronized to the same voltage, the same frequency, and the same phase as provided by the another AC/AC converter.

3. The system of claim 1, wherein the power rating of the UPS module is stored by the AC/AC converter.

4. The system of claim 1, wherein the power rating of the UPS module is a present maximum available power capacity of the UPS module.

5. The system of claim 1, wherein the controller of the AC/AC converter is further configured to:
   receive a synchronization signal from the another AC/AC converter that includes the same voltage, the same frequency, or the same phase.

6. A system to provide power to a recovered power bus, the system comprising:
   an AC/AC converter that receives power from a UPS module and generates a second power output which is applied to the recovered power bus, the AC/AC converter including a controller, wherein the controller is configured to:
   monitor the power by the UPS module;
   determine whether the UPS module is able to provide stranded power to the recovered power bus;
   determine an amount of stranded power that is able to be provided by the UPS module by calculating a difference between a power rating of the UPS module and an amount of power being provided by the UPS module; and
   controlling the AC/AC converter to supply power from the UPS module in an amount of the difference between the power rating of the UPS module and the amount of power being provided by the UPS module to the recovered power bus, wherein the second power output applied to the recovered power bus is synchronized to at least one of a same voltage, a same frequency, or a same phase as provided by another AC/AC converter that applies power to the recovered power bus.

7. The system of claim 6, wherein the second power output applied to the recovered power bus is synchronized to the same voltage, the same frequency, and the same phase as provided by the another AC/AC converter.

8. The system of claim 6, wherein the AC/AC converter includes an active rectifier front end to receive the AC power output from the UPS module.

9. The system of claim 6, wherein the AC/AC converter includes an inverter back end for generating the second power output applied to the recovered power bus.

10. The system of claim 6, wherein the power rating of the UPS module is stored by the AC/AC converter.

11. The system of claim 6, wherein the power rating of the UPS module is a present maximum available power capacity of the UPS module.

12. The system of claim 6, wherein the controller of the AC/AC converter is further configured to:
receive a synchronization signal from the another AC/AC converter that includes the same voltage, the same frequency, or the same phase.

13. A method for controlling operation of an AC/AC converter to provide stranded power to a recovered power bus, comprising:
monitoring AC power output by a UPS module associated with the AC/AC converter,
determining whether the UPS module is able to provide stranded power to the recovered power bus:
determining an amount of stranded power that is able to be provided by the UPS module by calculating a difference between a power rating of the UPS module and an amount of power being provided by the UPS module; and
controlling the AC/AC converter to supply power from the UPS module in an amount of the difference between the power rating of the UPS module and the amount of power being provided by the UPS module to the recovered power bus, wherein the power provided by the UPS module and applied to the recovered power bus is synchronized to at least one of a same voltage, a same frequency, or a same phase as provided by another AC/AC converter that applies power to the recovered power bus.

14. The method of claim 13, wherein the power provided by the UPS module and applied to the recovered power bus is synchronized to the same voltage, the same frequency, and the same phase as provided by another AC/AC converter.

15. The method of claim 13, wherein the power rating of the UPS module is stored by the AC/AC converter.

16. The method of claim 13, wherein the power rating of the UPS module is a present maximum available power capacity of the UPS module.

17. The method of claim 16, further comprising:
receiving an input data regarding the present maximum available power capacity of the UPS module from the UPS module.

18. The method of claim 13, wherein determining whether the UPS module is able to provide stranded power to the recovered power bus includes determining whether the UPS module is offline.

19. The method of claim 13, wherein determining whether the UPS module is able to provide stranded power to the recovered power bus includes determining whether a load supplied by the UPS module is drawing a maximum amount of power the UPS module is rated to provide.

20. The method of claim 13, further comprising:
receiving a synchronization signal from the another AC/AC converter that includes the same voltage, the same frequency, or the same phase.

* * * * *